United States Patent [19]

Yamakawa

[11] Patent Number: 4,758,074
[45] Date of Patent: Jul. 19, 1988

[54] VIDEO PROJECTOR LENS SYSTEM

[75] Inventor: Kazuo Yamakawa, Sakai, Japan

[73] Assignee: Minolta Camera Kabushiki Kaisha, Osaka, Japan

[21] Appl. No.: 853,427

[22] Filed: Apr. 18, 1986

[30] Foreign Application Priority Data

Apr. 27, 1985 [JP] Japan .................................. 60-91833

[51] Int. Cl.[4] .......................... G02B 13/18; G02B 9/34
[52] U.S. Cl. ..................................... 350/432; 350/412
[58] Field of Search ......................... 350/432, 412, 469

[56] References Cited

U.S. PATENT DOCUMENTS 3,429,997  2/1969  Rosner et al. .
3,516,734  6/1970  Schmidt .
3,800,085  3/1974  Ambats et al. .
3,868,173  2/1975  Miles et al. .
3,912,379  10/1975  De Jager ............................. 350/432
3,961,844  6/1976  Betensky .
4,348,081  9/1982  Betensky .

FOREIGN PATENT DOCUMENTS 56-78815   6/1981  Japan .
59-133517  7/1984  Japan .
59-170812  9/1984  Japan .
60-115908  6/1985  Japan .

Primary Examiner—John K. Corbin
Assistant Examiner—Rebecca D. Gass

[57] ABSTRACT

A video projector lens system is provided, which comprises, from the screen side to the tube side, a first positive lens having a screen side convex surface, a second negative meniscus lens having a screen side convex surface, a third biconvex lens, and a fourth negative lens having a screen side concave surface. The first and second lenses are made of a plastic material for cancelling the temperature depending characteristic of one of the first and second lenses with the counterbalanced refractive power of the other thereof, wherein at least one aspheric surface is applied to the lens system. The third lens bearing a considerable part of the positive refractive power distributed in the whole lens system is made of a glass material for avoiding further temperature dependency.

9 Claims, 3 Drawing Sheets

SPHERICAL
ABERRATION

ASTIGMATISM

SPHERICAL
ABERRATION

ASTIGMATISM

SPHERICAL
ABERRATION

ASTIGMATISM

VIDEO PROJECTOR LENS SYSTEM

BACKGROUND OF THE INVENTION

1. Field of the Invention

The present invention relates to a lens system for a video projector, and more particularly to a refractive lens system located in front of the cathode ray tube for projecting onto a screen a video image formed on a face plate of the cathode ray tube.

2. Description of the prior art

In designaing a lens system for a video projector of three-tube type, the correction of chromatic aberration can be generally left out of consideration, since three identical video projector lens systems are located in front of a three cathode ray tubes each forming decomposed three different monochromatic images, respectively, to project them toward a screen for composing one complete color image thereon, and each projector lens system is requested to transmit only such a monochromatic image. Strictly speaking, however, the monochromatic image is practically formed by light of a plurality of different wavelengths within a narrow wavelength band, the width of band depending on the spectral characteristic of fluorescent material of individual cathode ray tube. Especially, the images formed by the cathode ray tubes in charge of green image and blue image, respectively, are rather inadequate to be each regarded as a monochromatic image. Futhermore, the video projector lens system generally utilize plastic lens elements for forming aspheric surfaces thereon. The plastic lens element, however, generally shows a greater degree of variation in reflective index depending on the change in temperature, in comparison with a glass lens element. Therefore, image shifting depending on the change of temperature also causes an unnegligible problem.

Various video projector lens systems have been described in Patents or Patent Applications, such as U.S. Pat. Nos. 3,800,085, 4,348,081 and 4,530,575, Copending U.S. patent application Ser. No. 347,032 filed Feb. 8, 1982 now U.S Pat. No. 4,577,935, and Japanese Laid-Open Patent application Nos. 56-78815, and 59-170812.

SUMMARY OF THE INVENTION

An object of the present invention is to solve the above mentioned problems and provide an improved lens system for a video projector.

Another object of the present invention is to provide a video projector lens system in which the chromatic aberration and shifting of image point due to the temperature change can be decreased.

Still another object of the present invention is to provide such a high performance video projector lens system with a high speed.

The present invention provides a video projector lens system comprising, from the screen side to the tube side, a first positive lens having a screen side convex surface, a second negative lens, a third biconvex lens, and a fourth negative lens having a screen side concave surface, at least the third lens being made of a glass material, wherein the lens system includes at least one aspheric surface and fulfills the following conditions:

$$1.0 < |f_2|/f < 2.5$$

$$\nu_2 < 40$$

wherein f represents a focal length of the whole lens system, $f_2$ represents a focal length of the second lens, and $\nu_2$ represents an Abbe number of the second lens.

The features of the present invention, which are believed to be novel, are set forth with particularity in the appending claims. The present invention, both as to its organization and manner of operation, together with further objects and advantages thereof, may be best understood by reference to the following description, taken in conjunction with the accompanying drawings.

DETAILED DESCRIPTION OF THE PREFERRED EMBODIMENTS

The following specification, taken in conjunction with the drawings, sets forth the preferred embodiments of the present invention. The embodiments of the invention disclosed herein are the best modes contemplated by the inventor for carrying out his invention in the commercial optical video field, although it should be understood that various modifications can be accomplished within the parameters of the present invention.

Figure 1:
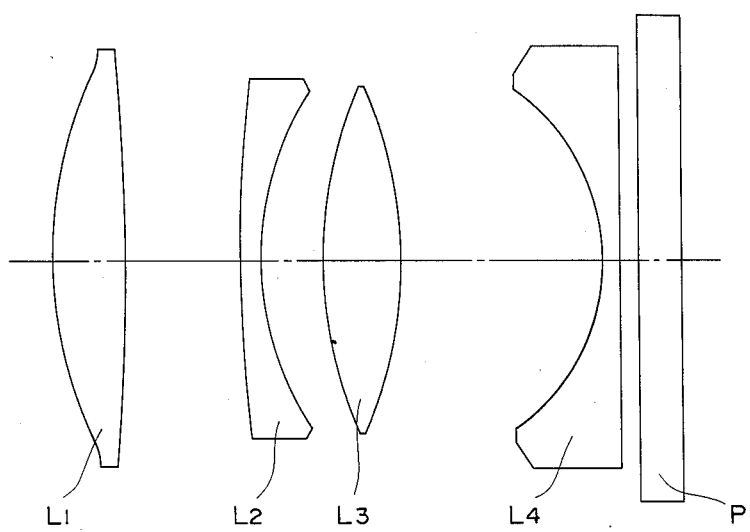
FIG. 1 represents a schematic cross sectional view of a first embodiment according to the present invention.
Figure 3:
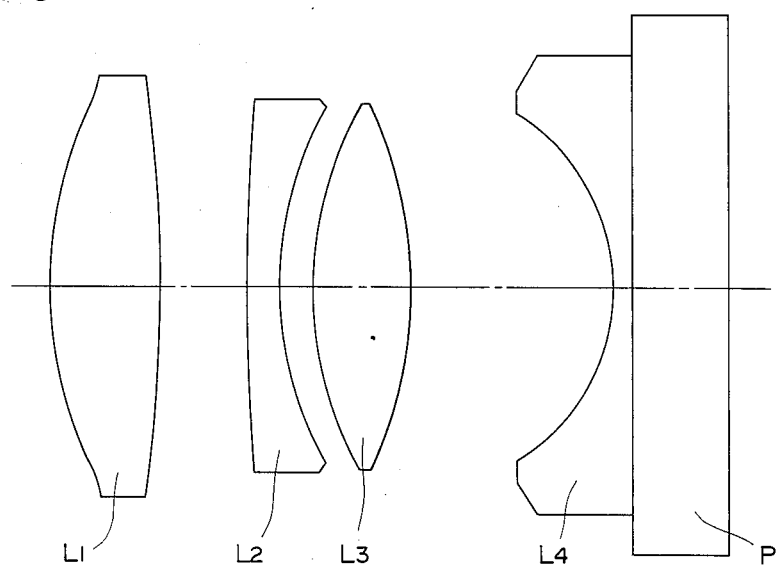
FIG. 3 represents a schematic cross sectional view of a second embodiment according to the present invention.
Figure 5:
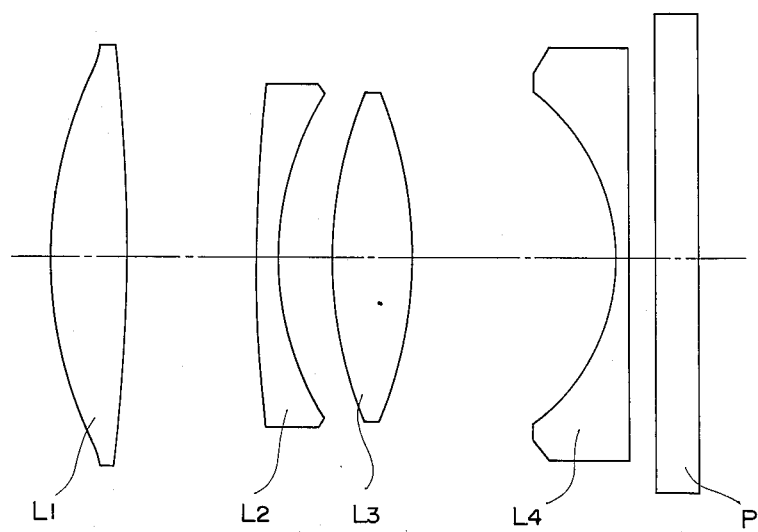
FIG. 5 represents a schematic cross sectional view of a third embodiment according to the present invention.

As is shown in FIGS. 1, 3 and 5, the present invention provides a lens system for projecting onto a screen (not shown) a video image formed on a face plate (P) of a cathode ray tube comprising, from the screen side to the tube side: a first positive lens ($L_1$) having a screen side convex surface; a second negative lens ($L_2$); a third biconvex lens ($L_3$); and a fourth negative lens ($L_4$) having a screen side concave surface, at least the third lens ($L_3$) being made of a glass material, wherein the lens system includes at least one aspheric surface and fulfills the following conditions:

$$1.0 < |f_2|/f < 2.5 \tag{1}$$

$$\nu_2 < 40 \tag{2}$$

wherein: f represents a focal length of the whole lens system; $f_2$ represents a focal length of the second lens ($L_2$); and $\nu_2$ represents an Abbe number of the second lens ($L_2$).

According to the present invention, at least one aspheric surface is adopted by utilizing at least one plastic lens element for successfully correcting aberrations, while a glass material is adopted to form at least the third lens ($L_3$), which bears a considerable part of the whole positive refractive power distributed in the lens system, for the purpose of reducing the temperature depending variation of the optical performance of the lens system. The glass element ($L_3$) is also effective to shield the X-ray radiation caused by the fluorescent surface of the cathode ray tube.

Above condition (1) is for balancing between the correction for the chromatic aberration and that for other aberrations according to the present invention. If the lower limit of the condition (1) is violated, the spherical aberration of higher degrees and the negative deviation of the field curvature would be caused. On the other hand, it would be difficult to correct the longitudinal chromatic aberration well, if the upper limit of the condition (1) is violated.

Condition (2), as well as the condition (1), relates to the correction of the chromatic aberration according to the present invention. In any case of violating the limits of the condition (2), it would be difficult to reduce the longitudinal chromatic aberration within a tolerable range.

In accordance with the present invention, the lens system is further recommended to fulfill the following conditions:

$$1 < d_2/d_4 < 5 \quad (3)$$

$$1.25 < f_1/f < 2.0 \quad (4)$$

$$n_3 > 1.55 \quad (5)$$

wherein: $d_2$ represents an axial distance between the first lens ($L_1$) and the second lens ($L_2$); $d_4$ represents an axial distance between the second lens ($L_2$) and the third lens ($L_3$); $f_1$ represents a focal length of the first lens ($L_1$); and $n_3$ represents a refractive index of the third lens ($L_3$).

Condition (3) is for balancing between the correction for paraxial aberrations and that for the off-axial aberrations by suitable location of the third lens ($L_3$). If the upper limit of the condition (3) is violated, the astigmatic difference would be increased undesirably. On the other hand, spherical aberration of higher degrees would be caused if the upper limit of the condition (3) is violated.

Condition (4) is for balancing between the correction for paraxial aberrations and that for the off-axial aberrations. If the lower limit of the condition (4) is violated, spherical aberration of higher degrees and negative deviation of the field curvature would be caused. On the other hand, over-correction of the field curvature and sagittal flare of off-axial light pencil would be caused if the upper limit of the condition (4) is violated. In any case of violating the limits of the condition (4), the lens system would fail to attain the desired high optical performace and the high speed due to the unbalance in correction between the paraxial and off-axial aberrations.

Condition (5) limits the refractive index of the third lens ($L_3$). In any case of violating the limits of the condition (5), any practical glass material effective to sufficiently shield X-ray radiation would be difficult to be obtained. And it would be difficult to properly correct various aberrations with good balance. Because, if a glass lens having no aspheric surface is applied to the third lens ($L_3$), it would be difficult to correct various aberrations, especially the spherical aberration, with good balance, since the radii of curvature of the third lens ($L_3$) becomes too small for keeping proper refractive power of the third lens ($L_3$).

Further according to the present invention, it is recommended to construct both of the first lens ($L_1$) and the second lens ($L_2$) as plastic materials. Generally speaking, the coefficient of variation in refractive index depending on the change in temperature for plastic material is extremely greater than that for glass material, i.e., the former is about ten to hundred times the latter. On the other hand, a negative lens element made of a material with a great dispersion (small value in terms of Abbe number) is necessary in the lens system for correcting chromatic aberration. According to the present invention, such a negative lens element is made of plastic, and its temperature depending optical performance is cancelled by another plastic lens element with a positive refractive power counterbalanced with the refractive power of the negative plastic lens element for correcting the temperature depending deviation of the image point. According to the present invention, the first lens ($L_1$) and the second lens ($L_2$) are made of plastic materials selected in accordance with the above described combination. The third lens ($L_3$) is made of a glass material according to the present invention.

The following Tables 1 to 3 show a first to third embodiments according to the present invention respectively. In the Tables, radii of curvature, $r_1,r_2,$—; axial distances, $d_1,d_2,$—; refractive indices for light of d-line (with a wavelength, 587.6 nm), $n_1,n_2,$—; and Abbe numbers for light of d-line, $\nu_1,\nu_2,$— are numbered from screen side to tube side. Further the radius of curvature with asterisk (*) means that the corresponding surface is an aspheric surface defined by the following formula;

$$X = \frac{C_0 Y^2}{1 + (1 - C_0^2 Y^2)^{\frac{1}{2}}} + \sum_{i=1}^{8} C_i Y^{2i}$$

wherein: X represents the coordinate along the optical axis measured from the top of the aspheric surface toward the tube side; Y represents the coordinate perpendicular to the optical axis measured from the optical axis (height from the optical axis); CO represents the curvature of the basic spheric surface of radius of curvature r ($C_0 = 1/r$) of the aspheric surface; and $c_i$ represents the aspheric surface coefficient. The lower part of Tables 1 to 3 summarizes the values for aspheric surface coefficients with respect to aspheric surfaces in each embodiments. (Radius of curvature of the aspheric surface in the paraxial region is equal to $C_0 + 2C_1$.)

Figure 2A:
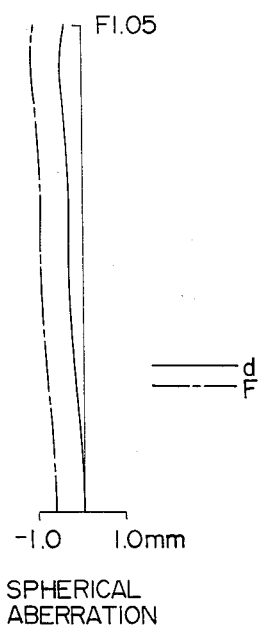
FIGS. 2a and 2b represent graphic plots of aberration curves of the first embodiment.
Figure 2B:
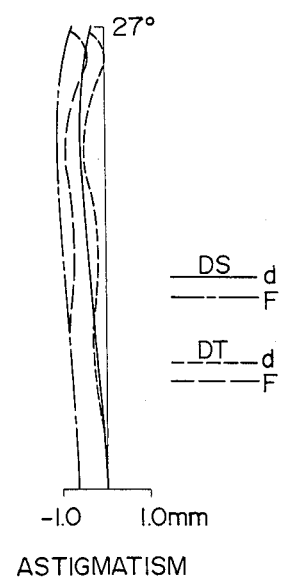
Figure 4A:
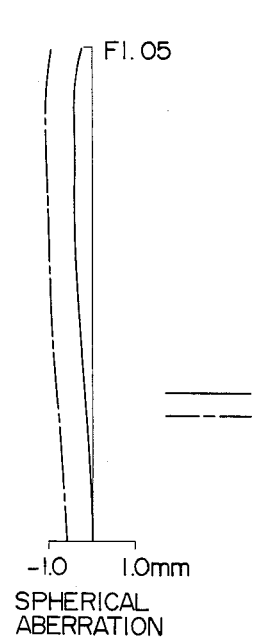
FIGS. 4a and 4b represent graphic plots of aberration curves of the second embodiment.
Figure 4B:
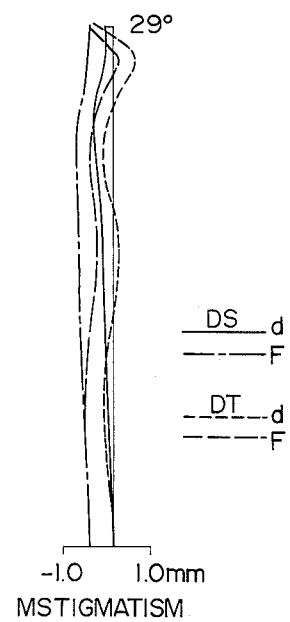
Figure 6A:
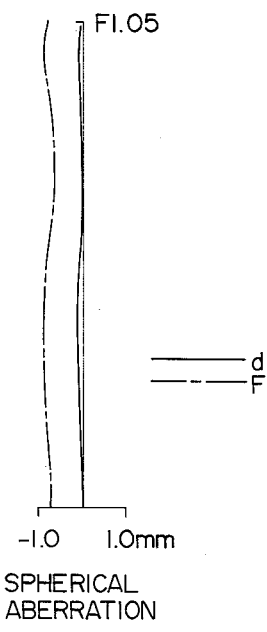
FIGS. 6a and 6b represent graphic plots of aberration curves of the second embodiment.
Figure 6B:
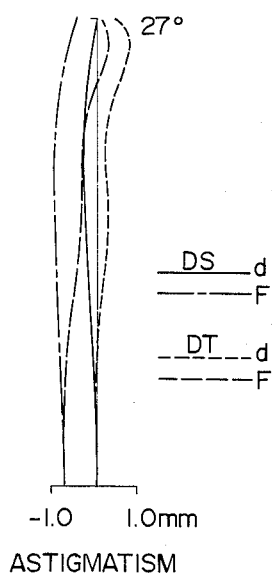

FIGS. 1, 3 and 5 represents the cross sectional views of the first to third embodiments, respectively. In these Figures and Tables, P represents the face plate of the cathode ray tube, the surface ($r_B$) corresponding to the fluorescent surface thereof. FIGS. 2, 4 and 6 represents the aberration curves of the first to third embodiments, respectively.

In all embodiments, the lens made of glass consists of a spheric single lens element. Such a modification is, however, possible that the glass lens element is modified into a composite aspheric glass lens element consisting of a base spheric glass lens element and a thin transparent resin layer coated or sticked on the base glass lens element with its air side surface made aspheric. Such a composite aspheric glass lens element can be utilized as the third lens ($L_3$) of the present invention. In this specification, the words, "a glass lens element" or "a lens made of glass" should be interpreted not only on a single glass lens element, but also on such a composite aspheric lens element.

Further, in the second embodiment of the present invention, the axial air space formed between the fourth lens ($L_4$) and the face plate (P) is very small. This slight air space can be filled up by the other material. If this filling up is not necessary, the fourth lens ($L_4$) may be cemented to the face plate (P) with removal of the air space therebetween. In such case, the axial distance between the surface ($r_8$) of the fourth lens ($L_4$) and the surface (rB) of the face plate (P) would be determined in accordance with the refractive index of the filling up material and the refractive index of the face plate (P).

While the parameters of the present invention can be found in the examples, the examples should not be considered limiting but rather illustrative of the advantages of the present invention. Accordingly, the parameters of the present invention should be measured solely from the appending claims.

TABLE 1

(Embodiment 1)
$f = 100$  $\beta = -0.061$  $F_{NO} = 1.05$

| | | | | | |
|---|---|---|---|---|---|
| $L_1$ | $r_1$* | 83.39 | | | |
| | | | $d_1$ 17.01 | $n_1$ 1.491 | $\nu_1$ 57.8 |
| | $r_2$ | −442.62 | | | |
| | | | $d_2$ 26.94 | | |
| | $r_3$ | 304.12 | | | |
| $L_2$ | | | $d_3$ 5.47 | $n_2$ 1.592 | $\nu_2$ 30.9 |
| | $r_4$ | 71.19 | | | |
| | | | $d_4$ 13.39 | | |
| | $r_5$ | 93.02 | | | |
| $L_3$ | | | $d_5$ 19.02 | $n_3$ 1.620 | $\nu_3$ 60.3 |
| | $r_6$ | −96.62 | | | |
| | | | $d_6$ 48.74 | | |
| | $r_7$* | −42.13 | | | |
| $L_4$ | | | $d_7$ 3.45 | $n_4$ 1.491 | $\nu_4$ 57.8 |
| | $r_8$ | ∞ | | | |
| | | | d 4.14 | | |
| | $r_A$ | ∞ | | | |
| P | | | d 10.35 | n 1.536 | $\nu$ 50.7 |
| | $r_B$ | ∞ | | | | aspheric surface coefficients

| | $r_1$ | $r_7$ |
|---|---|---|
| $C_2$ | $-0.47062 \times 10^{-6}$ | $0.27073 \times 10^{-5}$ |
| $C_3$ | $-0.12549 \times 10^{-9}$ | $-0.73863 \times 10^{-8}$ |
| $C_4$ | $-0.15711 \times 10^{-14}$ | $0.11481 \times 10^{-10}$ |
| $C_5$ | $0.50902 \times 10^{-17}$ | $-0.76826 \times 10^{-14}$ |
| $C_6$ | $-0.26165 \times 10^{-20}$ | $0.20436 \times 10^{-17}$ |
| $C_7$ | 0.0 | 0.0 |
| $C_8$ | 0.0 | 0.0 |

TABLE 2

(Embodiment 2)
$f = 100$  $\beta = -0.126$  $F_{NO} = 1.05$

| | | | | | |
|---|---|---|---|---|---|
| $L_1$ | $r_1$* | 82.30 | | | |
| | | | $d_1$ 26.15 | $n_1$ 1.491 | $\nu_1$ 57.8 |
| | $r_2$ | −331.99 | | | |
| | | | $d_2$ 21.95 | | |
| | $r_3$ | 1030.59 | | | |
| $L_2$ | | | $d_3$ 6.54 | $n_2$ 1.592 | $\nu_2$ 30.9 |
| | $r_4$ | 75.64 | | | |
| | | | $d_4$ 8.50 | | |
| | $r_5$ | 87.51 | | | |
| $L_3$ | | | $d_5$ 22.23 | $n_3$ 1.620 | $\nu_3$ 60.3 |
| | $r_6$ | −100.00 | | | |
| | | | $d_6$ 49.12 | | |
| | $r_7$* | −42.09 | | | |
| $L_4$ | | | $d_7$ 4.67 | $n_4$ 1.491 | $\nu_4$ 57.8 |
| | $r_8$ | ∞ | | | |
| | | | d 0.01 | | |
| | $r_A$ | ∞ | | | |
| P | | | d 22.76 | n 1.536 | $\nu$ 50.7 |
| | $r_B$ | ∞ | | | | aspheric surface coefficients

| | $r_1$ | $r_7$ |
|---|---|---|
| $C_2$ | $-0.46893 \times 10^{-6}$ | $0.24629 \times 10^{-5}$ |
| $C_3$ | $-0.10637 \times 10^{-9}$ | $-0.71711 \times 10^{-8}$ |
| $C_4$ | $0.14122 \times 10^{-14}$ | $0.10783 \times 10^{-10}$ |
| $C_5$ | $0.49309 \times 10^{-18}$ | $-0.70781 \times 10^{-14}$ |
| $C_6$ | $-0.13292 \times 10^{-20}$ | $0.18469 \times 10^{-17}$ |
| $C_7$ | 0.0 | 0.0 |
| $C_8$ | 0.0 | 0.0 |

TABLE 3

(Embodiment 3)
$f = 100$  $\beta = -0.105$  $F_{NO} = 1.05$

| | | | | | |
|---|---|---|---|---|---|
| $L_1$ | $r_1$* | 80.25 | | | |
| | | | $d_1$ 17.42 | $n_1$ 1.491 | $\nu_1$ 57.8 |
| | $r_2$ | −562.10 | | | |
| | | | $d_2$ 30.74 | | |
| | $r_3$ | 273.41 | | | |
| $L_2$ | | | $d_3$ 6.12 | $n_2$ 1.592 | $\nu_2$ 30.9 |
| | $r_4$ | 71.79 | | | |
| | | | $d_4$ 12.22 | | |
| | $r_5$ | 95.00 | | | |
| $L_3$ | | | $d_5$ 19.02 | $n_3$ 1.620 | $\nu_3$ 60.3 |
| | $r_6$ | −99.04 | | | |
| | | | $d_6$ 48.06 | | |
| | $r_7$* | −42.09 | | | |
| $L_4$ | | | $d_7$ 3.45 | $n_4$ 1.491 | $\nu_4$ 57.8 |
| | $r_8$ | ∞ | | | |
| | | | d 6.50 | | |
| | $r_A$ | ∞ | | | |
| P | | | d 10.35 | n 1.536 | $\nu$ 50.7 |
| | $r_B$ | ∞ | | | | aspheric surface coefficients

| | $r_1$ | $r_7$ |
|---|---|---|
| $C_2$ | $-0.45362 \times 10^{-6}$ | $0.30306 \times 10^{-5}$ |
| $C_3$ | $-0.12461 \times 10^{-9}$ | $-0.73998 \times 10^{-8}$ |
| $C_4$ | $0.90680 \times 10^{-14}$ | $0.11411 \times 10^{-10}$ |
| $C_5$ | $0.25549 \times 10^{-17}$ | $-0.75355 \times 10^{-14}$ |
| $C_6$ | $-0.21343 \times 10^{-20}$ | $0.19755 \times 10^{-17}$ |
| $C_7$ | 0.0 | $0.41446 \times 10^{-26}$ |
| $C_8$ | 0.0 | $0.23725 \times 10^{-30}$ |

What is claimed is:

1. A lens system for projecting onto a screen a video image formed on a face plate of a cathode ray tube comprising, from the screen side to the tube side:
    a first positive plastic lens having a screen side convex surface;
    a second negative plastic lens;
    a third biconvex lens; and
    a fourth negative lens having a screen side concave surface, at least the third lens including a glass material, wherein the lens system includes at least one aspheric surface and fulfills the following conditions:

$1.0 < |f_2|/f < 2.5$ $\nu_2 < 40$ wherein:
    f represents a focal length of the whole lens system;
    $f_2$ represents a focal length of the second lens; and
    $\nu_2$ represents an Abbe number of the second lens.

2. The invention of claim 1, wherein the lens system further fulfills the following condition:

$1 < d_2/d_4 < 5$ wherein:

$d_2$ represents an axial distance between the first lens and the second lens; and
$d_4$ represents an axial distance between the second lens and the third lens.

3. The invention of claim 2, wherein the lens system further fulfills the following condition:

$$1.25 < f_1/f < 2.0$$

wherein: $f_1$ represents a focal length of the first lens.

4. The invention of claim 3, wherein the lens system further fulfills the following condition:

$$n_3 > 1.55$$

wherein: $n_3$ represents a refractive index of the third lens.

5. The invention of claim 1, wherein the lens system further fulfills the following condition:

$$1.25 < f_1/f < 2.0$$

wherein: $f_1$ represents a focal length of the first lens.

6. The invention of claim 1, wherein the lens system further fulfills the following condition:

$$n_3 > 1.55$$

wherein: $n_3$ represents a refractive index of the third lens.

7. The invention of claim 1, wherein both of the first lens and the second lens are made of plastic materials.

8. A lens system for projecting onto a screen a video image formed on a face plate of a cathode ray tube comprising, from the screen side to the tube side:
 a first positive lens having a screen side convex surface, said first lens including at least an aspheric surface and being made of a plastic material;
 a second negative plastic meniscus lens having a screen side convex surface and having a first air space formed between the first lens and the second lens;
 a third biconvex lens made of a glass material and having a second air space formed between the second lens and the third lens; and
 a fourth negative lens having a screen side concave surface and having a third air space formed between the third lens and the fourth lens.

9. The invention of claim 8 comprising the following design parameters, wherein asterisk (*) represents the aspheric surface with the following aspheric surface coefficients $C_i$:

| | | $f = 100$ | $\beta = -0.061$ | $F_{NO} = 1.05$ | |
|---|---|---|---|---|---|
| $L_1$ | $r_1^*$ | 83.39 | | | |
| | | | $d_1$ 17.01 | $n_1$ 1.491 | $\nu_1$ 57.8 |
| | $r_2$ | −442.62 | | | |
| | | | $d_2$ 26.94 | | |
| $L_2$ | $r_3$ | 304.12 | | | |
| | | | $d_3$ 5.47 | $n_2$ 1.592 | $\nu_2$ 30.9 |
| | $r_4$ | 71.19 | | | |
| | | | $d_4$ 13.39 | | |
| $L_3$ | $r_5$ | 93.02 | | | |
| | | | $d_5$ 19.02 | $n_3$ 1.620 | $\nu_3$ 60.3 |
| | $r_6$ | −96.62 | | | |
| | | | $d_6$ 48.74 | | |
| $L_4$ | $r_7^*$ | −42.13 | | | |
| | | | $d_7$ 3.45 | $n_4$ 1.491 | $\nu_4$ 57.8 |
| | $r_8$ | ∞ | | | |
| | | | $d$ 4.14 | | |
| | $r_A$ | ∞ | | | |
| P | | | $d$ 10.35 | $n$ 1.536 | $\nu$ 50.7 |
| | $r_B$ | ∞ | | | | aspheric surface coefficients

| | $r_1$ | $r_7$ |
|---|---|---|
| $C_2$ | $-0.47062 \times 10^{-6}$ | $0.27073 \times 10^{-5}$ |
| $C_3$ | $-0.12549 \times 10^{-9}$ | $-0.73863 \times 10^{-8}$ |
| $C_4$ | $-0.15711 \times 10^{-14}$ | $0.11481 \times 10^{-10}$ |
| $C_5$ | $0.50902 \times 10^{-17}$ | $-0.76826 \times 10^{-14}$ |
| $C_6$ | $-0.26165 \times 10^{-20}$ | $0.20436 \times 10^{-17}$ |
| $C_7$ | 0.0 | 0.0 |
| $C_8$ | 0.0 | 0.0 | wherein L represents a lens, r represents a radius of curvature, d represents an axial distance, n represents an index of refraction, $\nu$ represents the Abbe number and P represents a face plate.

* * * * *